US006637632B2

(12) United States Patent  (10) Patent No.: US 6,637,632 B2
Chiku  (45) Date of Patent: Oct. 28, 2003

(54) CARD HOLDING STRUCTURE AND VEHICLE CONSOLE BOX HAVING THE SAME

(75) Inventor: Shigenobu Chiku, Utsunomiya (JP)

(73) Assignee: TS Tech Co., Ltd., Asaka (JP)

( * ) Notice: Subject to any disclaimer, the term of this patent is extended or adjusted under 35 U.S.C. 154(b) by 57 days.

(21) Appl. No.: 09/980,121

(22) PCT Filed: Mar. 28, 2001

(86) PCT No.: PCT/JP01/02553
§ 371 (c)(1),
(2), (4) Date: Nov. 30, 2001

(87) PCT Pub. No.: WO02/079047
PCT Pub. Date: Oct. 10, 2002

(65) Prior Publication Data
US 2003/0085245 A1 May 8, 2003

(51) Int. Cl.[7] .................................................. B60R 7/00
(52) U.S. Cl. .......................... 224/275; 224/227; 40/643; 40/649; 150/147; 206/39.5
(58) Field of Search ................................ 224/275, 277; 206/39, 39.1, 39.3, 39.4, 39.5, 39.7; 150/147; 221/55, 281, 285, 286, 232, 259, 276; 40/643, 649

(56) References Cited

U.S. PATENT DOCUMENTS

| 1,791,703 A | * | 2/1931 | Benedict et al. ............. 150/147 |
| 2,283,546 A | * | 5/1942 | Fischer .......................... 40/605 |
| 4,289,235 A | * | 9/1981 | Egly ........................ 206/387.13 |
| 5,588,697 A |   | 12/1996 | Yoshida et al. |
| 5,590,827 A | * | 1/1997 | Nimpoeno ................... 224/312 |
| 5,611,426 A | * | 3/1997 | Warfield .................... 206/308.1 |
| 5,718,329 A | * | 2/1998 | Ippolito et al. ................ 206/38 |
| 5,938,010 A | * | 8/1999 | Osterbye ....................... 206/38 |
| 6,026,873 A | * | 2/2000 | Van Geer .................... 150/147 |
| 6,050,014 A | * | 4/2000 | Ohlson .......................... 40/649 |
| 6,116,672 A | * | 9/2000 | Cannon et al. ........... 296/37.13 |
| 6,412,627 B1 | * | 7/2002 | Tiscione et al. ............ 206/39.4 |

FOREIGN PATENT DOCUMENTS

| JP | U 2-45017 | 3/1990 |
| JP | A 6-105707 | 4/1994 |
| JP | B2 2934808 | 6/1999 |
| JP | A 2000-16183 | 1/2000 |

* cited by examiner

Primary Examiner—Stephen K. Cronin
(74) Attorney, Agent, or Firm—Oliff & Berridge, PLC

(57) ABSTRACT

A card holding structure in which each held card is visible, and from which a desired card is easily extracted when a plurality of cards are held, and a vehicle console box having the same are provided. The card holding structure capable of holding cards comprises a base plate, a holding member and a step-like member. The base plate is approximately parallel to the held cards, and in which the holding member and the step-like member are formed. The holding member comprises a leg portion connected to the base plate, and a head portion extending from the leg portion and having an inner surface parallel to the base plate. The step-like member has a stairs configuration increasing in height from the base plate toward the head portion. Each step of the stairs configuration comprises a riser portion approximately perpendicular to the base plate, and a flat portion on which a card can be placed. A height of each riser is larger than a thickness of a card to be held. A depth of each flat portion is set such that respective cards are visible when the cards are placed on and held by the respective flat portions. A holding position for each card is different from each other.

18 Claims, 6 Drawing Sheets

CARD HOLDING STRUCTURE AND VEHICLE CONSOLE BOX HAVING THE SAME

TECHNICAL FIELD

The present invention relates to a card holding structure capable of holding a plurality of cards, and to a console box for vehicle, which has the card holding structure.

BACKGROUND ART

A vehicle console box (hereinafter, it is simply referred to as a console box) is disposed between vehicle seats, particularly beside the driver's seat. With such consol box, the one which is provided with a card holding portion for holding a card, such as a credit card, is known. The console box is attached to a side portion of a vehicle seat by such a bracket as disclosed in Japanese Patent No. 2934808 (U.S. Pat. No. 5,588,697), or the like. The console box turns downward from a horizontal state through 90 degrees by folding the bracket or the like, so that the console box can be collapsed and held vertically. An example of the card holding portion according to an earlier technology is shown in FIG. 5. FIG. 5 is a perspective view of a card holding portion disposed on a lid of a console box.

A card holding portion 30 as shown in FIG. 5 comprises a base plate 31 which is attached to a lid 40 of the console box, and a pair of holding members 32 which are formed on the base plate 31 for holding opposite shorter sides 21 of a rectangular card 20. A leg portion 32a of the holding member 32 is connected to the base plate 31. There is a specific space between a head portion 32b extending from the leg portion 32a and the base plate 31 such that a plurality of cards 20 are stored in the space.

A biasing member 33 biasing the held cards 20 toward the head portions 32b of the holding members 32 is integrally formed with the base plate 31 between the pair of holding members 32. The biasing member 33 leads to the base plate 31 at a base edge portion 33a. A front edge portion 33b extending from the base edge portion 33a has a shape protruding from the base plate 31. An opening 31a is formed in a portion of the base plate 31, corresponding to the biasing member 33. The biasing member 33 is capable of pitching about the base edge portion 33a with respect to the base plate 31, so that the biasing member 33 acts as a spring.

In order to hold the card 20 in the card holding portion 30, while the card 20 is slid from one edge side of the pair of holding members 32 in a direction of an arrow in FIG. 5 so that the card 20 will be parallel to the base plate 31, the card 20 is inserted between the head portions 32b of the holding members 32 and the base plate 31, and then held in the card holding portion 30.

Even if the card 20, the number of which is smaller than the maximal number to be held, is held in the card holding portion 30, since the biasing member 33 biases the card 20 toward the head portions 32b of the holding members 32, the card 20 does not rattle.

However, when the plurality of cards 20 are held in the above-described card holding portion 30, all the cards 20 are overlapped entirely as shown in FIG. 6. Thus, although the surface of the top card 20 is visible, other cards which are held under the top card 20 are invisible, so that they are not discriminated. That is, the user is required to check the card type every time the user uses the card. Thus, it is inconvenience.

Further, there is a problem that when the user needs to use the card which is not the top card, that is, which is held under the top card, the desired card is not extracted from the card holding portion 30 unless the card held above the card to be used is extracted therefrom.

The present invention is attained in view of the problem described above. An object of the present invention is to provide a card holding structure in which each held card is visible, and from which a desired card is easily extracted when a plurality of cards are held in the card holding structure.

Another object of the present invention is to provide a console box for a vehicle, which has the above-described card holding structure.

DISCLOSURE OF THE INVENTION

In order to accomplish the objects, according to one aspect of the present invention, a card holding structure which is capable of holding a plurality of cards comprises a base plate, a holding member and a step-like member. The base plate is approximately parallel to the plurality of cards when the plurality of cards are held. The holding member comprises a leg portion disposed on the base plate, and a head portion which extends from the leg portion and which has an inner surface parallel to the base plate. A space in which a plurality of cards are held is provided between the head portion of the holding member and the base plate, and the holding member holds a card between the base plate and the head portion. The step-like member is disposed on the base plate and has a stairs configuration which increases in height from the base plate toward the head portion of the holding member. Each step of the stairs configuration comprises a riser portion which is approximately perpendicular to the base plate, and a flat portion which is approximately parallel to the base plate. A card can be placed on the flat portion. A height of each riser portion is larger than a thickness of a card to be held. A depth of each flat portion is set such that respective cards are visible when the plurality of cards are placed on and held by the respective flat portions.

According to the card holding structure, the depth of each flat portion is determined such that the respective cards are visible when the plurality of cards are placed on and held by the flat portion of each step. Thus, each holding position for each card is different from each other along each step. That is, all the cards do not overlap entirely, so that the lower card is not hidden. Therefore, even if a plurality of cards are held, the design of each card is visible, so that only the desired card can be extracted.

With the card holding structure, the base plate may be provided with a biasing member for biasing the card between the base plate and the head portion of the holding member toward the head portion of the holding member.

According to the card holding structure, when a number of the held card is, for example, only one which is smaller than the maximal number of cards to be held, or when the cards of the maximal number to be held are held, the biasing member always biases the held card toward the head portion of the holding member. Thus, the head portion of the holding member and the card are brought into contact with each other, or the cards are brought into contact with each other, so that the card is pressed against the head portion of the holding member. That is, the held card is pressed by the biasing member so as not to move in the space where other cards can be stored, so that no held cards rattle or fall off from the holding structure. Therefore, the card can be stably held.

With the card holding structure, an opening may be formed in the base plate for extracting the held card by inserting a finger in the opening. Furthermore, it is preferable that the depth of each flat portion of the step-like member is at least smaller than a width of a card to be held.

According to a second aspect of the present invention, a console box for a vehicle comprises a card holding structure which is capable of holding a plurality of cards. The card holding structure comprises a base plate which is approximately parallel to a plurality of cards when the plurality of cards are held, a holding member and a step-like member. The holding member comprises a leg portion disposed on the base plate, and a head portion which extends from the leg portion and which has an inner surface parallel to the base plate. A space in which a plurality of cards are held is provided between the head portion and the base plate, and the holding member holds a card between the base plate and the head portion. The step-like member is disposed on the base plate and has a stairs configuration which increases in height from the base plate toward the head portion of the holding member. Each step of the stairs configuration comprises a riser portion which is approximately perpendicular to the base plate, and a flat portion which is approximately parallel to the base plate. A card can be placed on the flat portion. A height of each riser portion is larger than a thickness of a card to be held. A depth of each flat portion is set such that respective cards are visible when a plurality of cards are placed on and held by each flat portion.

PREFERRED EMBODIMENT OF THE INVENTION

Hereinafter, a console box having a card holding structure according to an embodiment of the present invention will be explained in detail with reference to the drawings.

Figure 1:
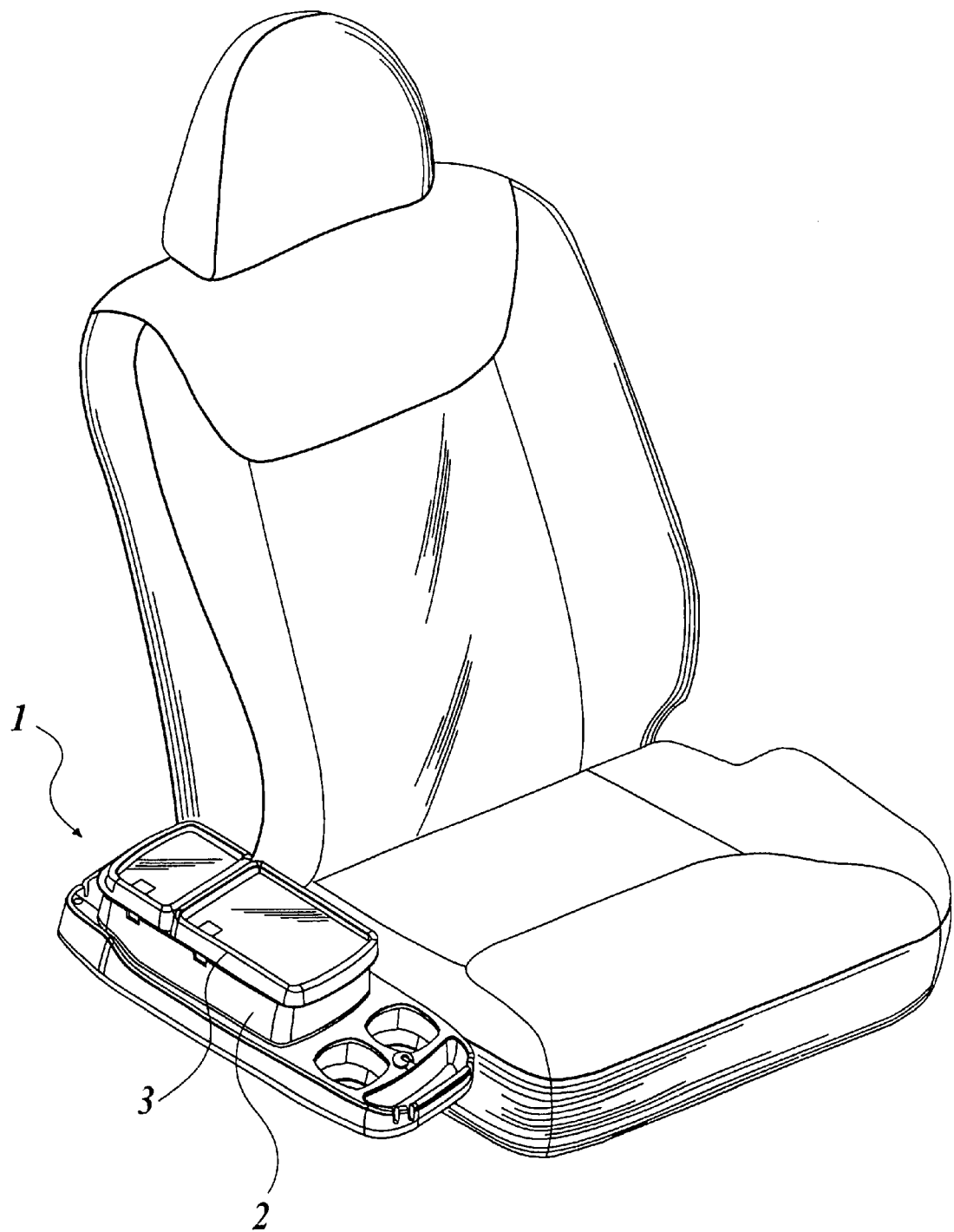
FIG. 1 is a perspective view of a vehicle console box which has a card holding structure according to an embodiment of the present invention, and which is attached to a side of the vehicle seat.
Figure 2:
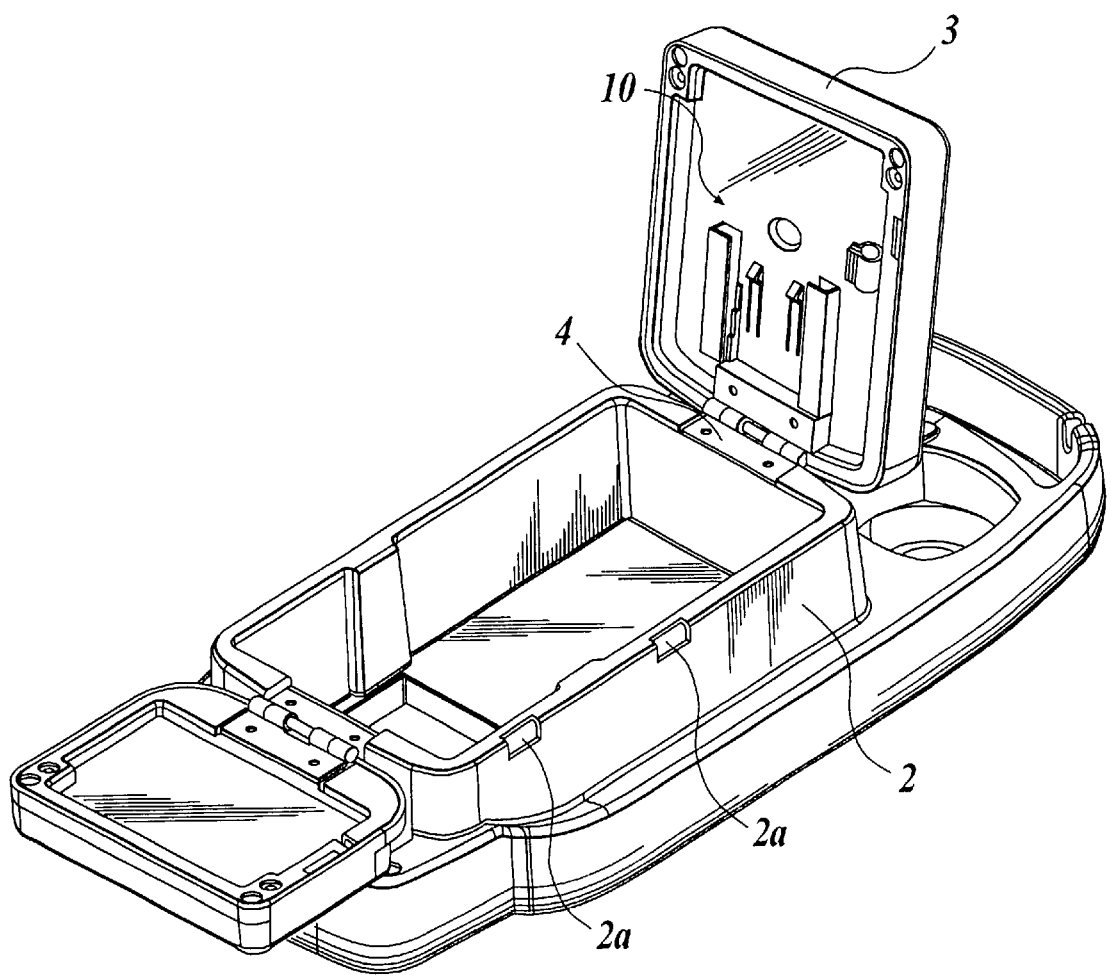
FIG. 2 is a perspective view of the vehicle console box of FIG. 1, wherein a lid of the console box, which is provided with the card holding structure, is opened.

FIG. 1 shows a vehicle console box 1 having a card holding structure according to the embodiment of the present invention, and the console box 1 is attached to a side of the vehicle seat. FIG. 2 shows the console box 1 of FIG. 1, which has a lid which is provided with the card holding structure 10. The console box 1 is attached to a side portion of the seat with a bracket or the like (not shown), and the console box 1 is disposed between the driver's seat and the assistant driver's seat. The console box 1 turns downward through 90 degrees from a horizontal state as shown in FIG. 1 by folding the bracket or the like, so that the console box 1 can be held in a vertical position. The console box 1 is made of polypropylene, and comprises a bottom portion 2 capable of storing small articles or the like, and a lid 3 which covers a portion of the bottom portion 2. The bottom portion 2 and the lid 3 are connected by a hinge 4. The lid 3 is pivotable on the hinge 4 with respect to the bottom portion 2.

Figure 3:
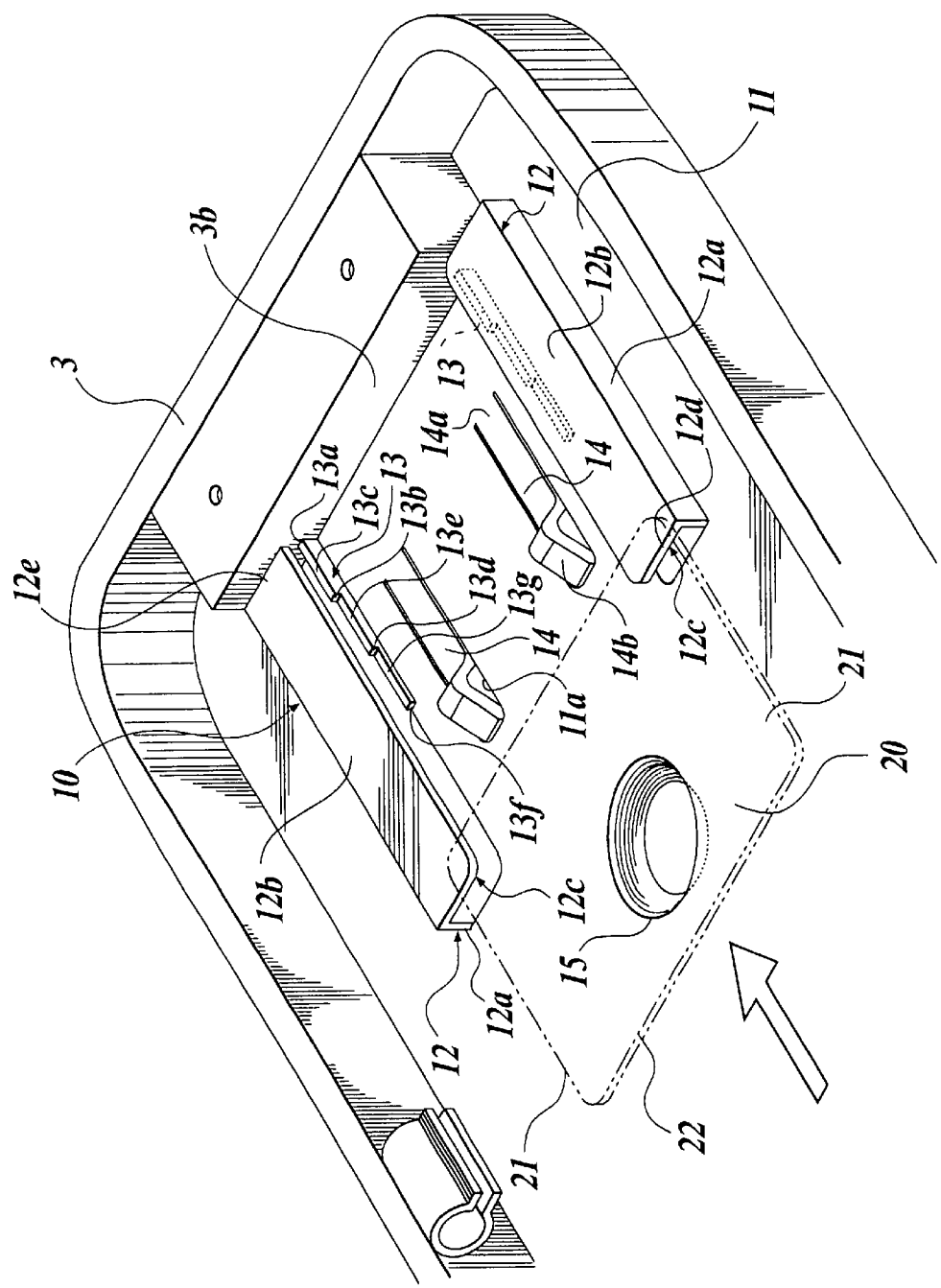
FIG. 3 is an enlarged perspective view showing the card holding structure of FIG. 2.
Figure 4:
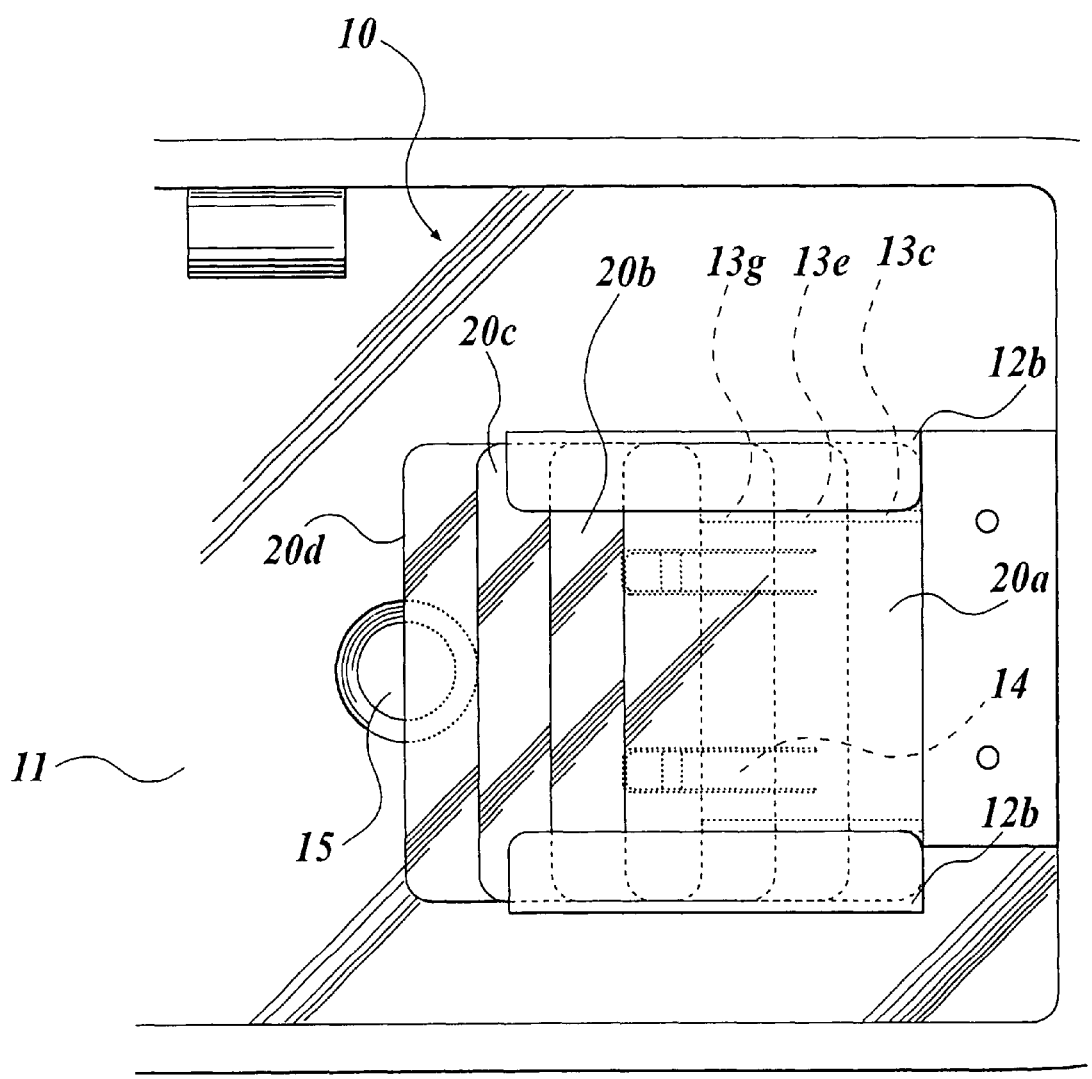
FIG. 4 is a front view of the card holding structure of FIG. 3 when the cards of the maximal number to be held are held in the card holding structure.
Figure 5:
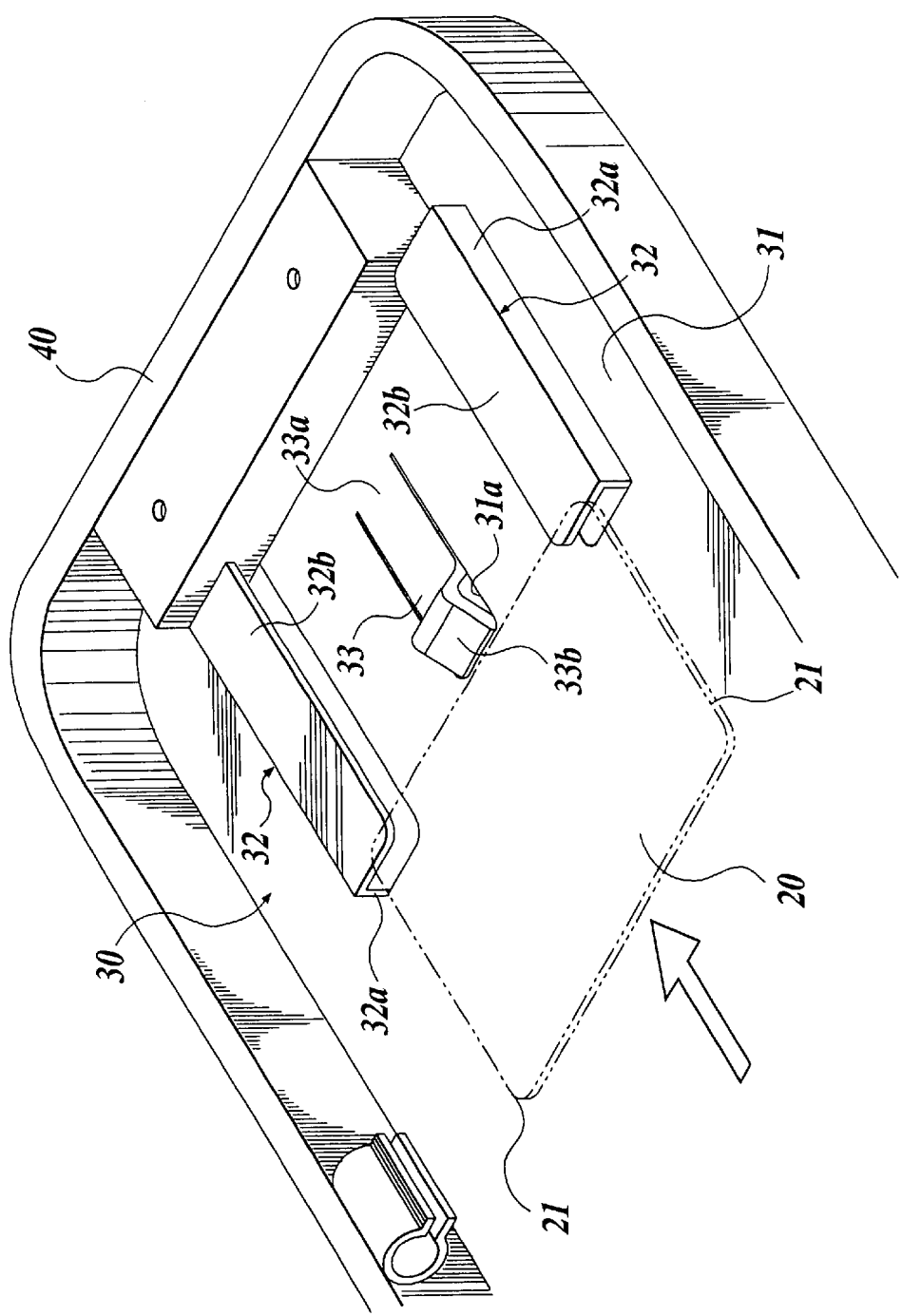
FIG. 5 is a perspective view showing a card holding structure disposed on a lid of a console box for a vehicle, according to an earlier technology.
Figure 6:
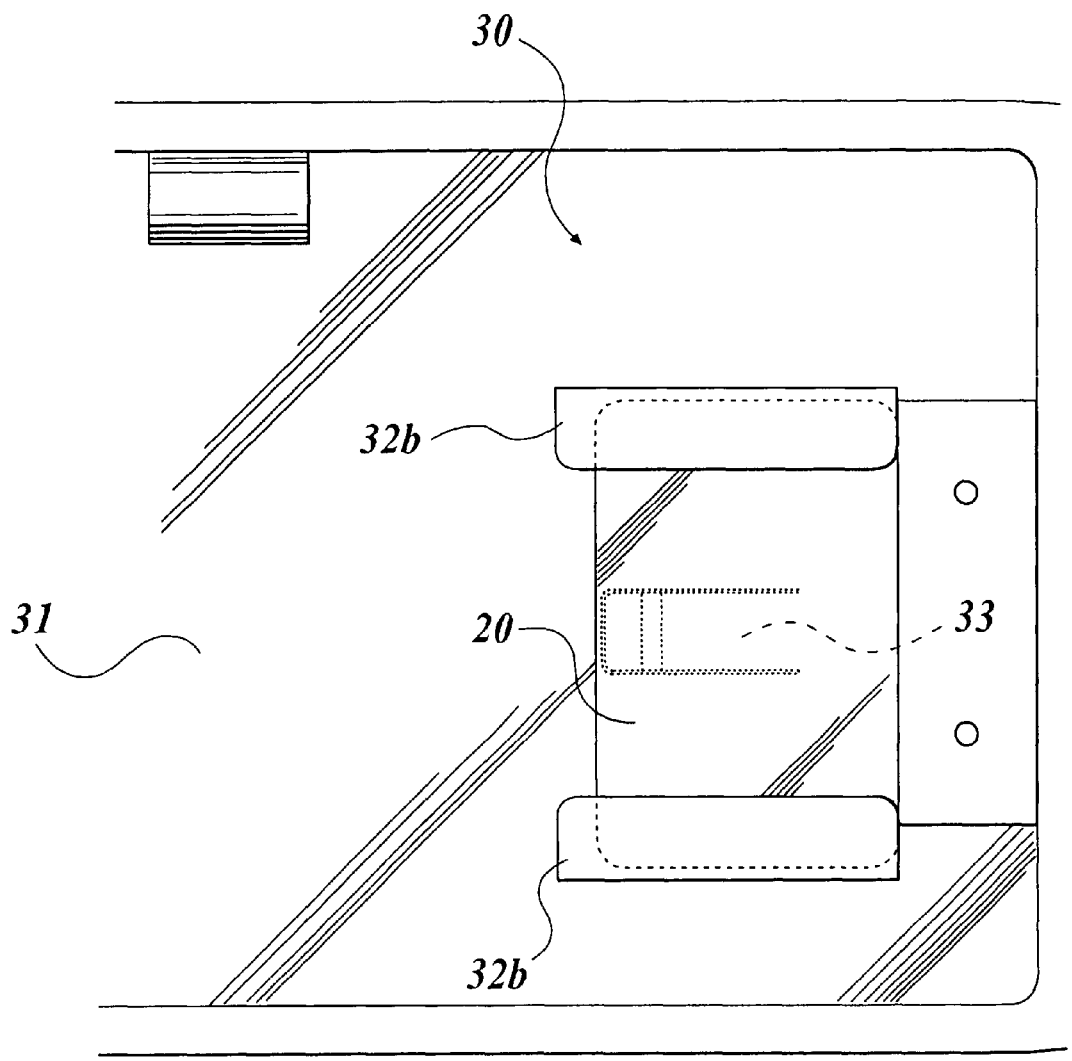
FIG. 6 is a front view of the card holding structure of FIG. 5, in which a plurality of cards are held.

Recess portions 2a are formed in the bottom portion 2 for easily opening and closing the lid 3. The lid 3 is provided with a card holding portion 10 for holding the card, such as credit card or the like, on an inner side of the console box 1. The card holding portion 10 according to the embodiment can hold four rectangular cards 20 as shown in FIG. 3. FIG. 3 is an enlarged perspective view of the card holding portion 10, in which the card 20 is shown with an imaginary line (chain double-dashed line) in order to explain the insertion of the card 20. FIG. 4 is a front view of the card holding portion 10 in which four cards 20a to 20d are held.

As shown in FIG. 3, the lid 3 has a recess at the inner side of the console box 1. A base plate 11 of the card holding portion 10 is attached to the recess portion. The card holding portion 10 has the base plate 11, a pair of holding members 12, a pair of step-like members 13, a pair of biasing members 14 and a finger insertion portion 15. They are integrally formed and made of polypropylene.

The pair of holding members 12 are for holding edges of opposite shorter sides 21 of the card 20. The holding members 12 are parallel to each other and formed with the base plate 11. Each holding member 12 has a leg portion 12a which is formed with the base plate 11 and approximately perpendicular to the base plate 11, and a head portion 12b which is parallel to the base plate 11 and approximately perpendicular to the leg portion 12a. The leg portions 12a are formed larger distance from each other with the base plate 11, which is larger than a longer side 22 of the card 20 to be held. Each head portion 12b extends from the leg portion 12a in a direction to face each other. The head portion 12b has a surface facing to the base plate 11, that is, an inner surface 12c which is approximately parallel to the base plate 11. There is a space between the head portion 12b and the base plate 11. A height of the leg portion 12a is set so that the edge portions of the respective shorter sides of the four cards 20a to 20d can be held in the space. The card 20 can be inserted from a space between the base plate 11 and edges 12d of the holding members 12, which position at a near side of FIG. 3, in the direction indicated by an arrow.

The size of the holding member 12 is not limited. However, in the embodiment for example, a length (depth) in the direction of card insertion (the direction indicated by the arrow in FIG. 3) is determined such that the holding member 12 covers almost the shorter sides of the first to third cards 20a to 20c and more than half of the shorter side of the fourth card 20d. On the other hand, the head portion 12b has a length in the direction along the longer side 22 of the card 20 such that the length is enough to certainly hold the card 20.

The pair of step-like members 13 are parallel to each other, and formed with the base plate 11. Each step-like member 13 is disposed below the head portion 12b of the each holding member 12. Respective edges 13a of the step-like members 13 and respective edges 12e of the holding members 12 at a side of the hinge 4 are disposed in a straight line. One edge 13a of the step-like member 13 and the edges 12e of the holding members 12 abut with a wall 3b of the lid 3. Each step-like member 13 has a stairs configuration which increases in height from the base plate 11 toward the head portion 12b, and along the direction of insertion of the card 20. Each step-like member 13 has three steps. The highest step has a riser portion 13b which is perpendicular to the base plate 11, and a flat portion 13c which is perpendicular to the riser portion 13b and parallel to the base plate 11. The middle step and the lowest step also have riser portions 13d and 13f, and flat portions 13e and 13g, respectively.

Each single card 20 is placed on each of the flat portions 13c, 13e and 13g. A length of each flat portion 13c, 13e and 13g along the direction of card insertion, that is, a depth of each flat portion 13c, 13e and 13g is set so that respective cards 20 may be visible when a plurality of cards 20 are placed on the respective flat portions 13c, 13e and 13g. In other words, the depth is at least shorter than the length of the shorter side 21 of the card 20. Although a height of the respective riser portions 13b, 13d and 13f is not limited if it is larger than the thickness of the card 20 to be held, the height is 0.8 mm in the embodiment.

There is a space in which the card 20 can be held, for example, a space of 0.8 mm between the flat portion 13c of the highest step and the head portion 12b of the holding member 12, that is, between the flat portion 13c and the inner surface 12c. A first card 20a is placed on the flat portions 13c of the highest steps. At this time, with respect to a surface of the card 20a, which faces to the base plate, only portions overlapping with the flat portions 13c of the highest steps are supported on the flat portions 13c. However, the card 20a is biased by biasing members 14 to be subsequently described toward the head portions 12b of the holding members 12, so that the card 20a does not rattle.

The second card 20b is placed on the flat portions 13e of the middle steps. Since the height of the riser portions 13b of the highest steps is larger than the thickness of the card 20 to be held, the second card 20b can be inserted in the space between the flat portions 13e of the middle steps and the first card 20a. One longer side of the second card 20b is brought into contact with the riser portions 13b of the highest steps. The difference of the positions between the first card 20a and the second card 20b is equivalent to the depth of the flat portions 13c of the highest steps, as shown in FIG. 4. That is, even if the second card 20b is stored below the first card 20a, a portion corresponding to the depth of the flat portions 13c of the highest steps does not overlap with the first card 20a by virtue of the stairs configuration of the step-like members 13. Thus, the design of the portion which does not overlap with the first card 20 is visible.

The third card 20c can be inserted in the space between the flat portions 13g of the lowest steps and the second card 20b. The third card 20c is placed on the flat portions 13g. At this time, one longer side of the third card 20c is brought into contact with the riser portions 13d of the middle steps. The position of the card 20c is different from that of the second card 20b. The difference of the positions is equivalent to the depth of the flat portions 13e of the middle steps, and the design of a portion of the card 20c, corresponding to the difference is visible.

Furthermore, the fourth card 20d can be inserted in the space between the third card 20c and the base plate 11. The fourth card 20d is placed on the base plate 11, and one longer side of the fourth card 20d is brought into contact with the riser portions 13f of the lowest steps. The position of the fourth card 20d is different from that of the third card 20c. The difference of the position is equivalent to the depth of the flat portions 13g of the lowest steps, and a part of design of the card 20d is visible.

The pair of biasing members 14 which bias the stored cards 20a to 20d toward the head portions 12b of the holding members 12 are formed with the base plate 11 between the step-like members 13. Each biasing member 14 is connected to the base plate 11 at a base edge portion 14a, and has a front edge portion 14b extending from the base edge portion 14a. The front edge portion 14b has a shape protruding from the base plate 11. Openings 11a are formed in the base plate 11 at positions corresponding to the biasing members 14. The biasing members 14 are capable of pitching about the base edge portions 14a with respect to the base plate 11 in a direction perpendicular to the base plate 11.

That is, the biasing members 14 serve as a spring. The front edge portions 14b have a height such that the tops of the front edge portions 14b can bias the first card 20a toward the head portions 12b of the holding members 12 even if the card 20a is placed on the flat portions 13c of the highest steps and only the card 20a is held in the card holding portion 10. When the card 20 is stored, the biasing members 14 are pressed toward the base plate 11 by the card 20 to be inserted against the biasing force of the biasing members 14. Therefore, the biasing members 14 always bias the card 20 toward the head portions 12b of the holding members 12. The biasing members 14 are formed at such positions as portions of all the held cards 20a to 20d are overlapped with the front edge portions 14b of the biasing members 14.

The finger insertion portion 15 is formed in the base plate 11, and has an opening upper portion and a recess against the side for holding the card 20. The finger insertion portion 15 has a structure into which the finger is inserted for extracting the card 20. The finger insertion portion 15 is formed at such position as a portion of the fourth card 20d and a portion of the insertion portion 15 are overlapped when the fourth card 20d is held in the card holding portion 10, as shown in FIG. 4. The size of the finger insertion portion 15 is set so that the finger can be inserted in a portion which does not overlap with a portion of the fourth card 20d.

In order to hold the card 20 in the card holding portion 10 having the above-described configuration, while the first card 20a is slid from the near side of FIG. 3, parallel to the base plate 11, in the direction indicated by the arrow as shown in FIG. 3, the first card 20a is inserted in the space between the head portions 12b of the holding members 12 and the base plate 11 from the side of the edges 12d of the holding members 12. The first card 20a is passed above the tops of the front edge portions 14b against the biasing force of the biasing members 14, and inserted between the flat portions 13c of the highest steps of the step-like members 13 and the head portions 12b, and then slid until the first card 20a is brought into contact with the wall 3b of the lid 3. At this time, the biasing members 14 are slightly pressed against the base plate 11. The first card 20a is placed on the flat portions 13c of the highest steps and held between the flat portions 13c and the head portions 12b, while the first card 20a is biased by the biasing members 14 toward the head portions 12b.

Next, the second card 20b is inserted in the same way as the first card 20a except that the second card 20b is inserted between the first card 20a and the flat portions 13e of the middle steps, and slid until the second card 20b is brought into contact with the riser portions 13b of the highest steps. The second card 20b is held between the first card 20a and the flat portions 13e of the middle steps.

The third card 20c is also inserted in the same way as the second card 20b except that the third card 20c is inserted between the second card 20b and the flat portions 13g of the lowest steps, and slid until the third card 20c is brought into contact with the riser portions 13d of the middle steps. The third card 20c is held between the second card 20b and the flat portions 13g of the lowest steps.

The fourth card 20d is also inserted between the base plate 11 and the third card 20c from the same direction as the first card 20a, and slid above the tops of the front edge portions 14b against the biasing force of the biasing members 14. The fourth card 20d is then slid until it is brought into contact with the riser portions 13f of the lowest steps, and held between the base plate 11 and the third card 20c.

As described above, when the card 20a to 20d of the maximal number to be held are inserted, the cards 20a to 20d are held as shown in FIG. 4. Each holding position of each of the cards 20a to 20d is different from each other along the step-like members 13, so that not only the design of the highest first card 20a but also a part of design of each of the cards 20b to 20d held below the first card 20a is visible. All of the cards 20a to 20d are biased toward the head portions 12b of the holding members 12 by the biasing members 14, so that the cards 20a to 20d do not rattle, and a rattle does not occur during operation of the vehicle.

When the held cards 20a to 20d are extracted from the card holding portion 10, the cards 20a to 20d may be slid in the opposite direction of the direction of card insertion, and then extracted from the card holding portion 10. When the plurality of cards 20a to 20d are held and biased by the biasing members 14, and it is difficult to extract the card, the user may insert, for example, an index finger in the finger insertion portion 15 and slide the surface of the desired card with a thumb. When the fourth card 20d is extracted, the portion thereof which overlaps with the finger insertion portion 15 may be pinched with the fingers and extracted.

When the extracted cards 20a to 20d are replaced, while the cards 20a to 20d are slid against the biasing force of the biasing members 14, the cards 20a to 20d may be inserted in the original position.

As described above, the embodiment according to the present invention is explained, however, the present invention is not limited to the embodiment. Needless to say, without departing from the spirit and scope thereof, various changes and modifications of the present invention can be made. For example, in the present invention, although the four cards are held, the maximal number to be held is not limited to four, and may be not more than four or not less than four. Although the console box 1 is attached to the side surface of the seat, it may be integrally formed with the body of the vehicle.

Industrial Applicability

According to the present invention, even if a plurality of cards are held, discrimination among the cards is easy, and a desired card can easily be extracted. Therefore, the card holding structure according to the present invention is particularly suitable for a card holder in the console box for a vehicle.

What is claimed is:

1. A card holding structure which is capable of holding a plurality of cards, the structure comprising:
a base plate approximately parallel to the plurality of cards when the plurality of cards are held;
a holding member comprising a leg portion disposed on the base plate and a head portion extending from the leg portion, the head portion having an inner surface parallel to the base plate, wherein a space in which a plurality of cards are held is provided between the head portion and the base plate, and the holding member holds a card between the base plate and the head portion; and
a step-like member disposed on the base plate, the step-like member having a stairs configuration which increases in height from the base plate toward the head portion of the holding member, each step of the stairs configuration comprising a riser portion which is approximately perpendicular to the base plate and a flat portion which is approximately parallel to the base plate, wherein a card can be placed on the flat portion, a height of each riser portion is larger than a thickness of a card to be held, and a depth of each flat portion is set such that respective cards are visible when the plurality of cards are placed on and held by the respective flat portions,
wherein the base plate is provided with a biasing member for biasing the card between the base plate and the head portion of the holding member toward the head portion of the holding member, and the flat portions of the step-like member are not overlapped.

2. The card holding structure as claimed in claim 1, wherein an opening is formed in the base plate for extracting the held card by inserting a finger in the base plate.

3. The card holding structure as claimed in claim 1, wherein the depth of each flat portion is at least smaller than a width of a card to be held.

4. The card holding structure as claimed in claim 1, wherein a longitudinal direction of the step-like member is approximately parallel to a longitudinal direction of the holding member.

5. The card holding structure as claimed in claim 1, wherein a pair of the step-like members is provided inwardly of the holding member.

6. The card holding structure as claimed in claim 1, wherein the structure is fixed to a fixing member.

7. The card holding structure as claimed in claim 1, wherein a pair of the holding members is provided on the base plate by facing to each other.

8. The card holding structure as claimed in claim 7, wherein each long side of the head portions of the holding members and each long side of the leg portions of the holding members have approximately the same length as a short side of the card, and one end portion of the step-like member is placed on a straight line connecting an end of one holding member with an end of the other holding member, the one end portion having a highest flat portion of the step-like member, and the straight line being perpendicular to a longitudinal direction of the holding members.

9. The card holding structure as claimed in claim 8, wherein a length of the step-like member is shorter than a length of each holding member.

10. A console box for a vehicle, comprising a card holding structure capable of holding a plurality of cards, the card holding structure comprising:
a base plate approximately parallel to the plurality of cards when the plurality of cards are held;
a holding member comprising a leg portion disposed on the base plate and a head portion extending from the leg portion, the head portion having an inner surface parallel to the base plate, wherein a space in which a plurality of cards are held is provided between the head portion and the base plate, and the holding member holds a card between the base plate and the head portion; and
a step-like member disposed on the base plate, the step-like member having a stairs configuration which increases in height from the base plate toward the head portion of the holding member, each step of the stairs configuration comprises a riser portion which is approximately perpendicular to the base plate and a flat portion which is approximately parallel to the base plate, wherein a card can be placed on the flat portion, a height of each riser portion is larger than a thickness of a card to be held, and a depth of each flat portion is set such that respective cards are visible when the plurality of cards are placed on and held by the respective flat portions, wherein the base plate is provided with a biasing member for biasing the card between the base plate and the head portion of the holding member toward the head portion of the holding member, and the flat portions of the step-like member are not overlapped.

11. The console box as claimed in claim 10, wherein an opening is formed in the base plate for extracting the held card by inserting a finger in the base plate.

12. The console box as claimed in claim 10, wherein the depth of each flat portion is at least smaller than a width of a card to be held.

13. The console box as claimed in claim 10, wherein a longitudinal direction of the step-like member is approximately parallel to a longitudinal direction of the holding member.

14. The console box as claimed in claim 10, wherein a pair of the step-like members is provided inwardly of the holding member.

15. The console box as claimed in claim 10, wherein the structure is fixed to a fixing member.

16. The console box as claimed in claim 10, wherein a pair of the holding members is provided on the base plate by facing to each other.

17. The console box as claimed in claim 16, wherein each long side of the head portions of the holding members and each long side of the leg portions of the holding members have approximately the same length as a short side of the card, and one end portion of the step-like member is placed on a straight line connecting an end of one holding member with an end of the other holding member, the one end portion having a highest flat portion of the step-like member, and the straight line being perpendicular to a longitudinal direction of the holding members.

18. The console box as claimed in claim 17, wherein a length of the step-like member is shorter than a length of each holding member.

* * * * *